United States Patent [19]

Ogawa et al.

[11] Patent Number: 4,933,828
[45] Date of Patent: Jun. 12, 1990

[54] CONTROL SYSTEM FOR VOLTAGE-SOURCE PULSE WIDTH MODULATION STEP-UP RECTIFIER

[75] Inventors: Yutaka Ogawa, Fuchu; Toshio Kadokura, Kunitachi, both of Japan

[73] Assignee: Kabushiki Kaisha Toshiba, Kawasaki, Japan

[21] Appl. No.: 388,501

[22] Filed: Aug. 2, 1989

[30] Foreign Application Priority Data

Aug. 12, 1988 [JP] Japan .................. 63-201516

[51] Int. Cl.⁵ .................... H02M 7/797; H02M 7/458
[52] U.S. Cl. ...................................... 363/81; 318/812; 363/37
[58] Field of Search ....................... 363/37, 44, 79, 80, 363/81, 87; 318/729, 803, 812

[56] References Cited

U.S. PATENT DOCUMENTS 4,625,272 11/1986 Okuyama et al. ..................... 363/81

FOREIGN PATENT DOCUMENTS 55-94583 7/1980 Japan .
79478 5/1983 Japan .................... 363/81
66593 4/1986 Japan .................... 318/729

Primary Examiner—William H. Beha, Jr.
Attorney, Agent, or Firm—Foley & Lardner, Schwartz, Jeffery, Schwaab, Mack, Blumenthal & Evans

[57] ABSTRACT

In a voltage-source PWM step-up converter connected to an a.c. power supply through a reactor, even in the case where a reactor voltage drop $V_L$ changes in dependence upon a load current, it is required to compensate such a change to control a d.c. voltage so that it is equal to a predetermined value. Since this reactor voltage drop $V_L$ has a phase shift of substantially 90 degrees with respect to an a.c. power supply voltage, a control signal for compensating such a phase shift, resulting in the possibility that is exceeds above a linear control range of the control circuit to reach the saturation range. In view of this, in accordance with this invention, control signal means for compensating a reactor voltage drop $V_L$ is provided in the control circuit, thereby making it possible to perform a stable control to provide a stable d.c. output.

4 Claims, 2 Drawing Sheets

10
CONTROL SYSTEM FOR VOLTAGE-SOURCE PULSE WIDTH MODULATION STEP-UP RECTIFIER

FIELD OF THE INVENTION

This invention relates to a control system for a voltage-source PWM (Pulse Width Modulation) step-up converter connected to a power supply through a reactor.

BACKGROUND OF THE INVENTION

There has been already proposed a frequency converter including a power supply side converter for converting an a.c. power delivered from an a.c. power supply through a reactor to a d.c. power, and a motor side converter for delivering a variable voltage and variable frequency a.c. power to an a.c. motor, both converters being comprised of a voltage-source PWM (Pulse Width Modulation) converter, d.c. terminals of the both converter, d.c. terminals of the both converters being connected to each other, a smoothing capacitor being connected between positive and negative terminals of the both converters. This frequency converter can attain an improvement in a power-factor when viewed from an a.c. power supply, i.e., power-factor on the side of power supply, and can carry out delivery and receipt of a power during power running of a motor and a power during regenerative running thereof.

When a load current flows in a frequency converter of this kind, a voltage drop $V_L$ is produced in a reactor connected between the a.c. power supply and the power supply side converter. The power supply side converter must compensate such a voltage drop as well to perform a control operation so that its output voltage becomes equal to a predetermined value. Assuming that a power-factor on the power supply is designated by $\Phi$ and the relationship expressed as $\Phi \approx 1$ holds, this voltage drop $V_L$ is produced at a phase lagging by an angle of 90 degrees with respect to the power supply voltage. When an attempt is made to compensate voltage drop $V_L$ produced at a phase lagging by an angle of 90 degrees by using the power supply side converter to control its output voltage so that it is equal to a predetermined value, the control circuit for the power supply side converter would have to handle a larger control signal as a vector. Particularly in the case where a load current is large, since the reactor voltage drop $V_L$ also become large, the control signal also becomes large, resulting in the possibility that the control signal exceeds above the linear control range of the control circuit to reach the saturation range. When the operation mode of the control circuit has reached the saturation range, there occurs an extraordinary state in control such that a d.c. voltage on the power supply side converter is lowered during power running and is raised during regenerative running.

SUMMARY OF THE INVENTION

An object of this invention is to provide a control system for a voltage-source PWM step-up converter capable of carrying out a stable control without causing an extraordinary state in state irrespective of a load current.

To achieve this object, this invention is characterized in that means for compensating reactor voltage drop $V_L$ is provided in a control circuit. Thus, even in the case where a load current becomes large, hence the reactor voltage drop $V_L$ becomes large, there is no possibility that the control signal becomes large to exceed above the linear control range of the control circuit to reach the saturation range. Accordingly, even at the time of power running or at the time of regenerative running, a stable d.c. voltage can be obtained at all times.

BRIEF DESCRIPTION OF THE DRAWINGS

In the accompanying drawings.

DETAILED DESCRIPTION OF THE PREFERRED EMBODIMENT

Figure 3:
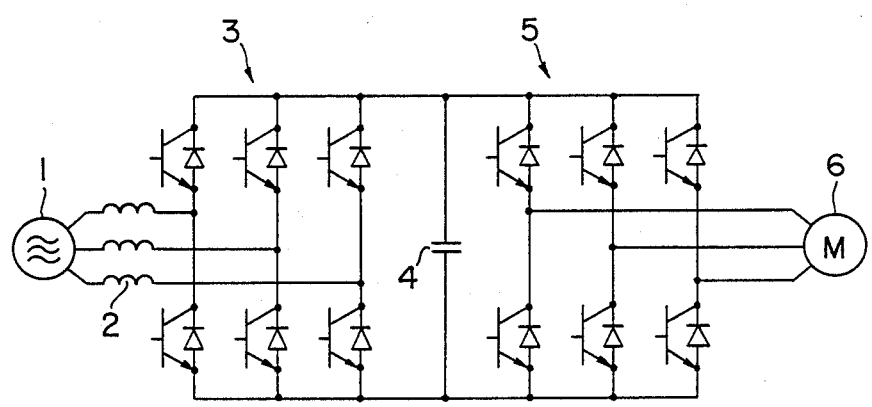
FIG. 3 is a circuit diagram showing a frequency converter to which this invention is applied.

Referring to FIG. 3, there is shown a circuit configuration of a frequency converter to which this invention is applied. A controlled a.c. power is delivered from a commercial a.c. power supply 1 to an a.c. motor 6, e.g., an induction motor through a reactor 2, a power supply side converter 3, a smoothing capacitor 4, and a motor side converter 5. The power supply side converter 3 and the motor side converter 5 have the same circuit configuration. Each arm of respective converters is composed of switching elements of self-quenching elements, e.g., transistors or GTOs (Gate Turn Off Thyristors), etc., and diodes connected antiparallel therewith. In this figure, transistors are illustrated as the respective switching elements. While controlling a voltage of the d.c. circuit, i.e., a voltage across the smoothing capacitor 4 so that it becomes equal to a predetermined value, this frequency converter can deliver a power from the a.c. power supply 1 to the a.c. motor 6 through the power supply side converter 3 and the motor side converter 5 during power running, and can, in contrast with the above, regenerate a power from the a.c. motor 6 to the a.c. power supply 1 through the motor side converter 5 and the power side converter 3, thus permitting a power factor on the side of the power supply to be satisfactory. The power supply side converter 3 can perform a so-called step-up control to adjust a d.c. circuit voltage (capacitor voltage) so that this voltage becomes equal to a predetermined value higher than a voltage crest or peak value of the a.c. power supply 1 in cooperation with the reactor 2 and the smoothing capacitor 4. This invention is concerned with a control system for the power supply side converter 3 in such a frequency converter.

Figure 1:
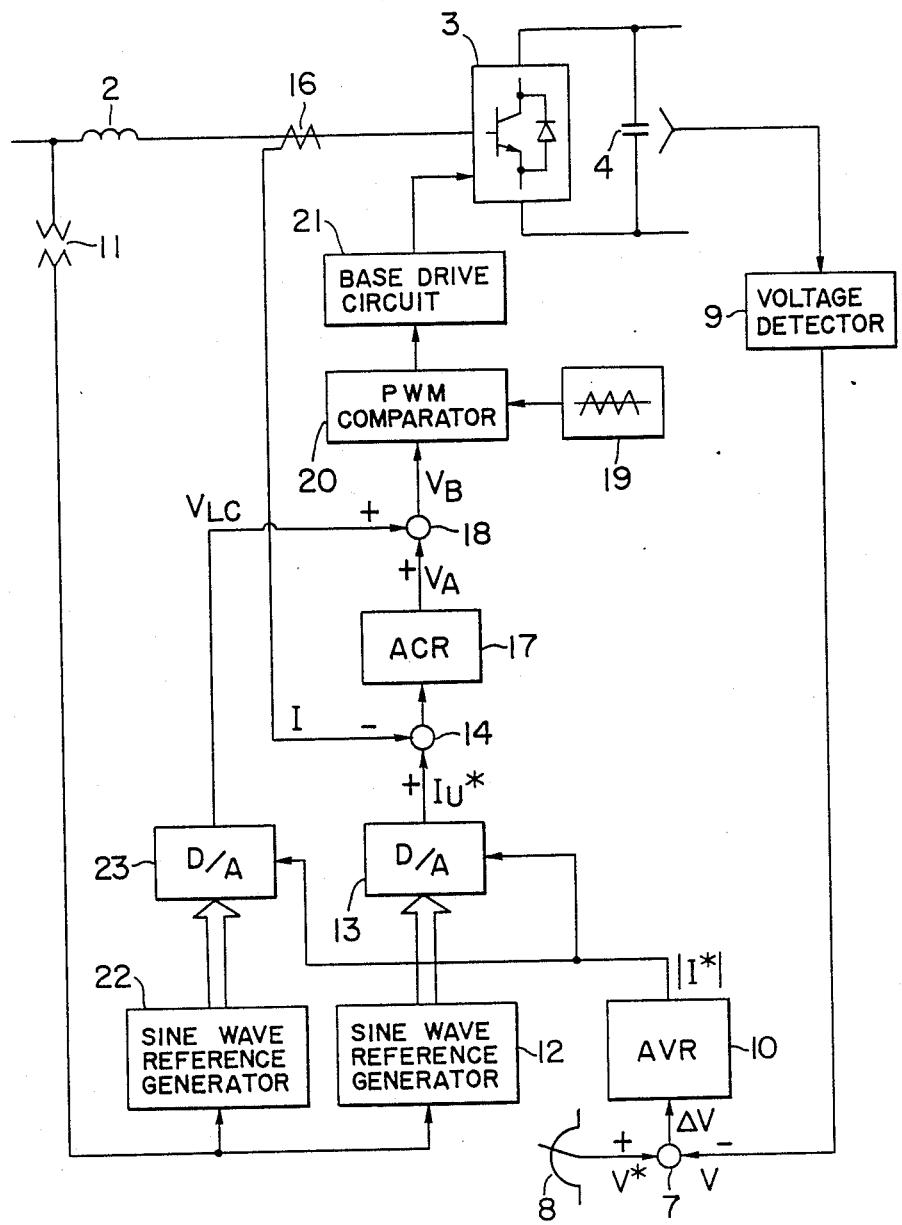
FIG. 1 is a block diagram showing an embodiment of a control system for a voltage-source PWM step-up converter according to this invention.

Referring to FIG. 1, there is shown a control system of this invention used for the power supply side converter 3.

Figure 2:
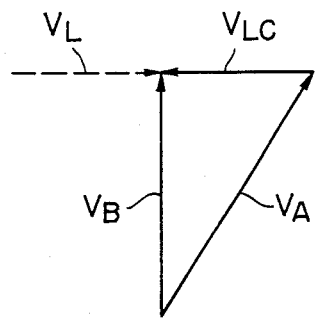
FIG. 2 is a vector diagram for explaining the operation of the control system shown in FIG. 1.

At an adder 7, a voltage reference V* set by a voltage reference setter 8 is compared with an actual voltage V detected by a voltage detector 9. A deviation ΔV obtained is input to a voltage controller (AVR) 10. The voltage controller 10 outputs, in the form of a d.c. signal, a current amplitude reference |I*| allowing the deviation to be equal to zero, i.e., allowing an actual voltage V to be in correspondence with the voltage reference V*. A voltage of the a.c. power supply 1, i.e., a power supply side voltage of the reactor 2 is detected by a voltage detector 11. Thus, a first sinewave reference generator 12 generates a first sine wave reference of a digital signal synchronous with a voltage detected. Further, a second sine-wave reference generator 22 generates a second sine wave reference of a digital signal leading the first sine wave reference by a phase angle of 90 degrees. The first sine wave reference generated by the first sine-wave reference generator 12 is input to a first multiplying D/A (digital-to-analog) converter 13. Further, the second sine wave reference generated by the second sine-wave reference generator 22 is input to a second multiplying D/A converter 23. The first D/A converter 13 outputs, in the form of an analog signal, a current reference $I_U^*$ corresponding to a product of the sine wave reference from the sine-wave reference generator 12 and a current amplitude reference $|I^*|$ from the voltage controller 10. On the other hand, the second D/A converter 23 outputs a voltage compensation command $V_{LC}$ proportional to a product of the sine wave reference leading in phase from the sine-wave reference generator 22 and the current amplitude reference $|I^*|$ from the voltage controller 10. At an adder 14, the current reference $I_U^*$ from the first D/A converter 13 is compared with a load current I detected by a current detector 16. A deviation obtained is input to a current controller (ACR) 17. The current controller 7 outputs a voltage command $V_A$ for allowing the input deviation to be equal to zero. The voltage command $V_A$ from the current controller 17 and the voltage compensation command $V_{LC}$ from the D/A converter 23 are both delivered to an adder 18, at which summation of the both commands is performed as a vector. The sum (vector sum) thus obtained is delivered to the first input terminal of a PWM comparator 20 as a PWM control command $V_B$ (see FIG. 2). To the PWM comparator 20, a carrier wave signal of a triangular wave generated by an oscillator 19 is input as a second input signal. The PWM comparator 20 responds to the both input signals to output a PWM control signal to control an ON/OFF operation of respective switching elements constituting the power supply side converter 3.

The operation of the control system shown in FIG. 1 will now be described.

As previously described, the phase of the reactor voltage drop $V_L$ lags by an angle of substantially 90 degrees with respect to the output voltage of the a.c. power supply 1. On the other hand, the phase of the sine wave reference output from the sine-wave reference generator 22 leads by an angle of 90 degrees with respect to the output voltage of the a.c. power supply 1. Accordingly, the voltage compensation command $V_{LC}$ output from the D/A converter 23 has a relationship such that its phase is opposite to that of the reactor voltage drop $V_L$, i.e., a relationship such that there is a phase difference of 180 degrees (see FIG. 2), and has an amplitude corresponding to the current amplitude reference $|I^*|$, i.e., the load current I.

In accordance with the control system shown in FIG. 1, where a load current I flows through the reactor 2, its voltage drop $V_L$ can be canceled by the voltage compensation command $V_{LC}$ obtained by the sine-wave reference generator 22 and the D/A converter 23. By providing a smaller PWM control command Vs is provided in this way. Thus, a PWM control of the power side converter 3 is carried out through the PWM comparator 20 and the base drive circuit 21 in accordance with this PWM control command $V_B$. As is clear from the foregoing description, this invention can carry out a stable control without causing an extraordinary state in control irrespective of the load current I to output a stable d.c. voltage.

What is claimed is:

1. A control system for a voltage-source pulse width modulation step-up converter (hereinafter abbreviated as a PWM converter) comprising:
   a reactor connected in series between an a.c. power supply and an a.c. terminal of said PWM converter,
   a smoothing capacitor connected between d.c. terminals of said PWM converter,
   means for detecting an input voltage applied to said reactor,
   means for detecting a d.c. voltage V across said smoothing capacitor,
   means for detecting a load current flowing in said PWM converter,
   means for setting a voltage reference V* with respect to said PWM converter,
   means for outputting a current amplitude reference $|I^*|$ on the basis of a deviation between said voltage reference V* and said d.c. voltage V,
   means for outputting a current reference $I_U^*$ synchronous with said input voltage to said reactor and having an amplitude corresponding to said current amplitude reference $|I^*|$,
   means for outputting a voltage command $V_A$ for allowing said load current I to be in correspondence with said current reference $I_U^*$,
   means for outputting a voltage compensation command $V_{LC}$ leading said input voltage to said reactor by a phase angle of 90 degrees and having an amplitude corresponding to said current amplitude reference $|I^*|$,
   means for calculating a vector sum of said voltage command $V_A$ and said voltage compensation command $V_{LC}$ to output said vector sum as a PWM control command $V_B$, and
   means for effecting a PWM control of said PWM converter on the basis of said PWM control command $V_B$.

2. A control system as set forth in claim 1, wherein said means for outputting said current reference $I_U^*$ is composed of a sine-wave reference generator for outputting, as a sine wave reference, in the form of a digital signal, a sample value synchronous with said input voltage to said reactor and corresponding to an instantaneous value of said input voltage, and a digital-to-analog converter for outputting, in the form of an analog signal, a signal corresponding to a product of an output signal from said sine-wave reference generator and said current amplitude reference $|I^*|$.

3. A control system as set forth in claim 1, wherein said means for outputting voltage compensation command $V_{LC}$ is composed of a sine-wave reference generator for Outputting, as an input voltage sine wave reference, in the form of a digital signal, a sample value leading said input voltage to said reactor by a phase angle of 90 degrees and corresponding to an instantaneous value of said input voltage to said reactor, and a multiplying digital-to-analog converter for outputting, in the form an analog signal, a signal corresponding to a product of an output signal from said sine-wave reference generator and said current amplitude reference $|I^*|$.

4. A control system as set forth in claim 1, wherein said means for carrying out PWM control includes an oscillator for generating a triangular carrier wave, and a PWM comparator responsive to said triangular carrier wave generated by said oscillator and said PWM control command Vs to output a control command for carrying out an ON/OFF control of switching elements of said PWM converter.

* * * * *